United States Patent [19]
Sands et al.

[11] Patent Number: 6,064,569
[45] Date of Patent: May 16, 2000

[54] COMPUTER AND HARD DRIVE HAVING A MULTIPLE DROP LIGHT PIPE

[75] Inventors: Steven Sands, Austin; Ty Schmitt, Round Rock, both of Tex.

[73] Assignee: Dell USA, L.P., Round Rock, Tex.

[21] Appl. No.: 09/190,471

[22] Filed: Nov. 12, 1998

[51] Int. Cl.[7] ................................................ G06F 1/16
[52] U.S. Cl. .............................................. 361/685; 362/32
[58] Field of Search .............................. 361/685; 362/32, 362/26, 133

[56] References Cited

U.S. PATENT DOCUMENTS

| | | |
|---|---|---|
| 5,327,328 | 7/1994 | Simms et al. . |
| 5,345,367 | 9/1994 | Pierce et al. . |
| 5,349,504 | 9/1994 | Simms et al. . |
| 5,613,873 | 3/1997 | Bell, Jr. . |
| 5,654,873 | 8/1997 | Smithson et al. . |
| 5,764,481 | 8/1999 | Ruch et al. ............................. 361/685 |
| 5,790,374 | 8/1998 | Wong ..................................... 361/685 |
| 5,912,799 | 6/1999 | Grouell et al. ......................... 361/685 |
| 5,938,324 | 8/1999 | Salmon et al. ......................... 362/555 |

*Primary Examiner*—Leo P. Picard
*Assistant Examiner*—John D. Reed
*Attorney, Agent, or Firm*—Haynes & Boone, L.L.P.

[57] ABSTRACT

A computer, and a hard drive assembly for use in the computer, according to which a mounting member, having a plurality of light sources mounted thereon, is disposed in the chassis of the computer. One or more hard drive assemblies are provided, each including a carrier mounted in the chassis, a plurality of light pipes mounted on the carrier and extending through the carrier, and a hard drive unit mounted in the carrier. One end of each light pipe registers with a corresponding light source to transfer the light from the light sources through the light pipes and the carrier for providing a visual indication at the other end of each of the light pipes.

10 Claims, 3 Drawing Sheets

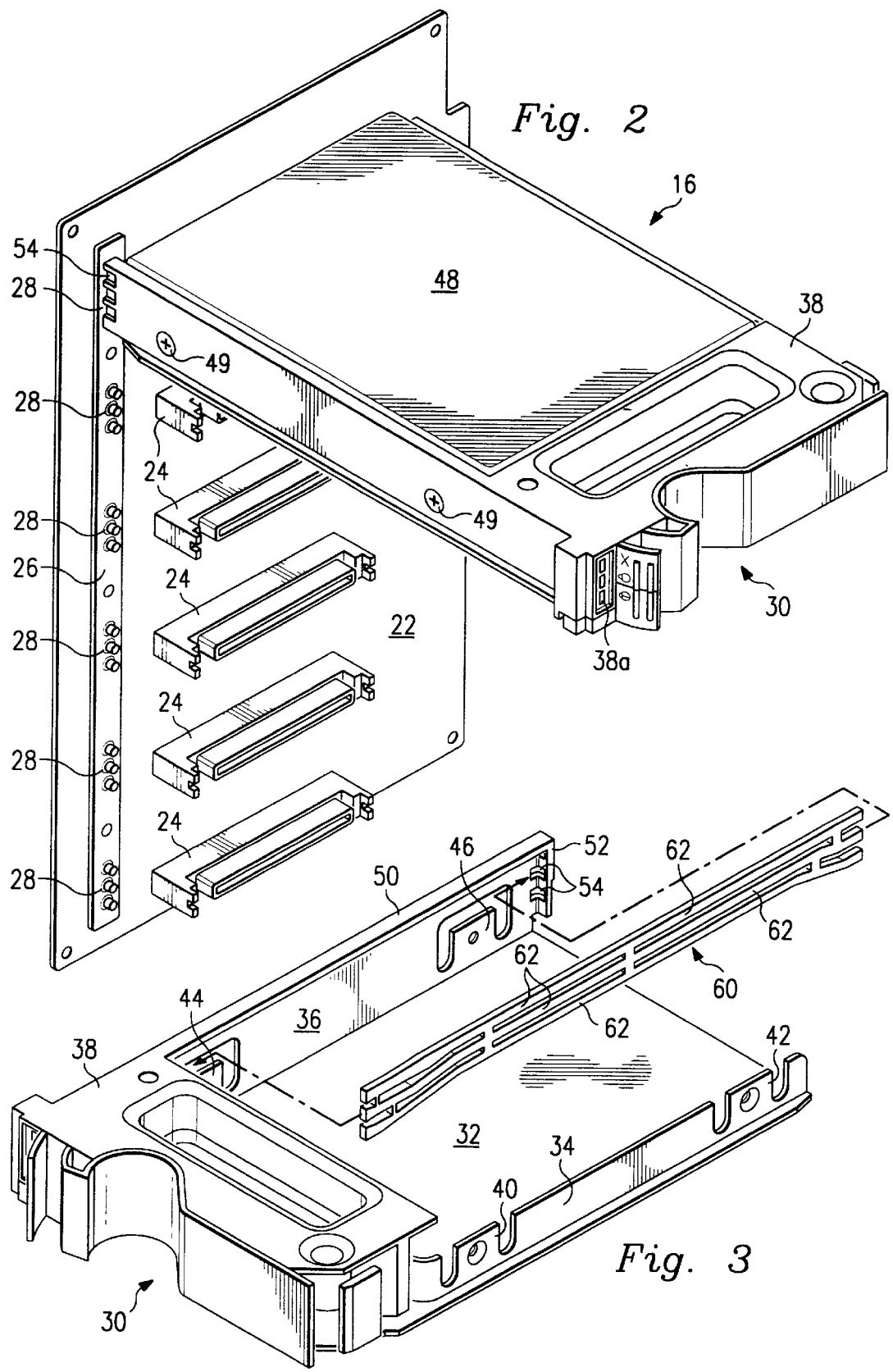

COMPUTER AND HARD DRIVE HAVING A MULTIPLE DROP LIGHT PIPE

BACKGROUND

This disclosure relates to a computer and a hard drive assembly for use in the computer, and, more particularly, to a computer, having one or more light sources and a hard drive assembly for transmitting the light sources for providing visual indications of certain functions of the computer.

Almost all computers, or central processing units, incorporate light sources, such as liquid crystal displays (LEDs), to display information, such as power status, floppy drive status, and the like. However, space limitations make it very difficult to mount the light sources on the front panel of the computer chassis.

This problem is especially acute in connection with computers having multiple hard drives disposed in a stacked relationship in the computer housing. In connection with these computers, which are termed "servers", the light sources are used as drive power and fault indicators and are usually mounted either on the front surface of the hard drive carrier or on a separate printed wire assembly adjacent the hard drive. In both cases extra hardware is required to bring the indicators forward in the assembly.

However, in connection with servers that have multiple visual indicators, it is very difficult to utilize multiple wire assemblies and multiple light pipes in the available space. To further compound the problem, the hard drive carriers ideally should be optimized for both 1 inch and 1.6 inch hard drives, thus requiring the lightpipe to be optimized for each hard drive.

Although attempts have been made to mount a light source, such as an LED, on the back wall or panel of the chassis of the server and use cabling or a light pipe to transfer the light from the source to the front panel or to the hard drive carrier, this has been limited to a single light source and has not been achieved in connection with multiple sources.

SUMMARY

The present disclosure, accordingly, is directed to a computer and a hard drive assembly in which the light from multiple light sources at the back of the computer chassis is transferred through the hard drive assembly to the front of the chassis to provide function indications.

To this end, according to an embodiment of the present invention, a computer is provided according to which a mounting member, having a plurality of light sources mounted thereon, is disposed in the chassis of the computer. One or more hard drive assemblies are provided, and each includes a carrier mounted in the chassis, a plurality of light pipes mounted on the carrier and extending through the carrier, and a hard drive unit mounted in the carrier. One end of each light pipe registers with a corresponding light source to transfer the light from the light sources through the light pipes and the carrier for providing a visual indication at the other end of each of the light pipes.

This system enjoys several advantages. For example, it enables light from multiple light sources on the back wall of a computer chassis, or cabinet, to be transmitted to the front of the chassis. This is especially advantageous in connection with servers having a plurality of hard drives, since each hard drive can be provided with multiple function indicators. Also, the system will accommodate hard drive assemblies of different heights without compromising the light-transmitting ability through the light pipes.

BRIEF DESCRIPTION OF THE DRAWINGS

FIG. 2 is an enlarged view depicting a mounting plate and hard drive assembly of the computer of FIG. 1.

FIG. 3 is a partially exploded view of the hard drive carrier of the hard drive assembly of FIG. 2.

DESCRIPTION OF THE PREFERRED EMBODIMENT

Figure 1:
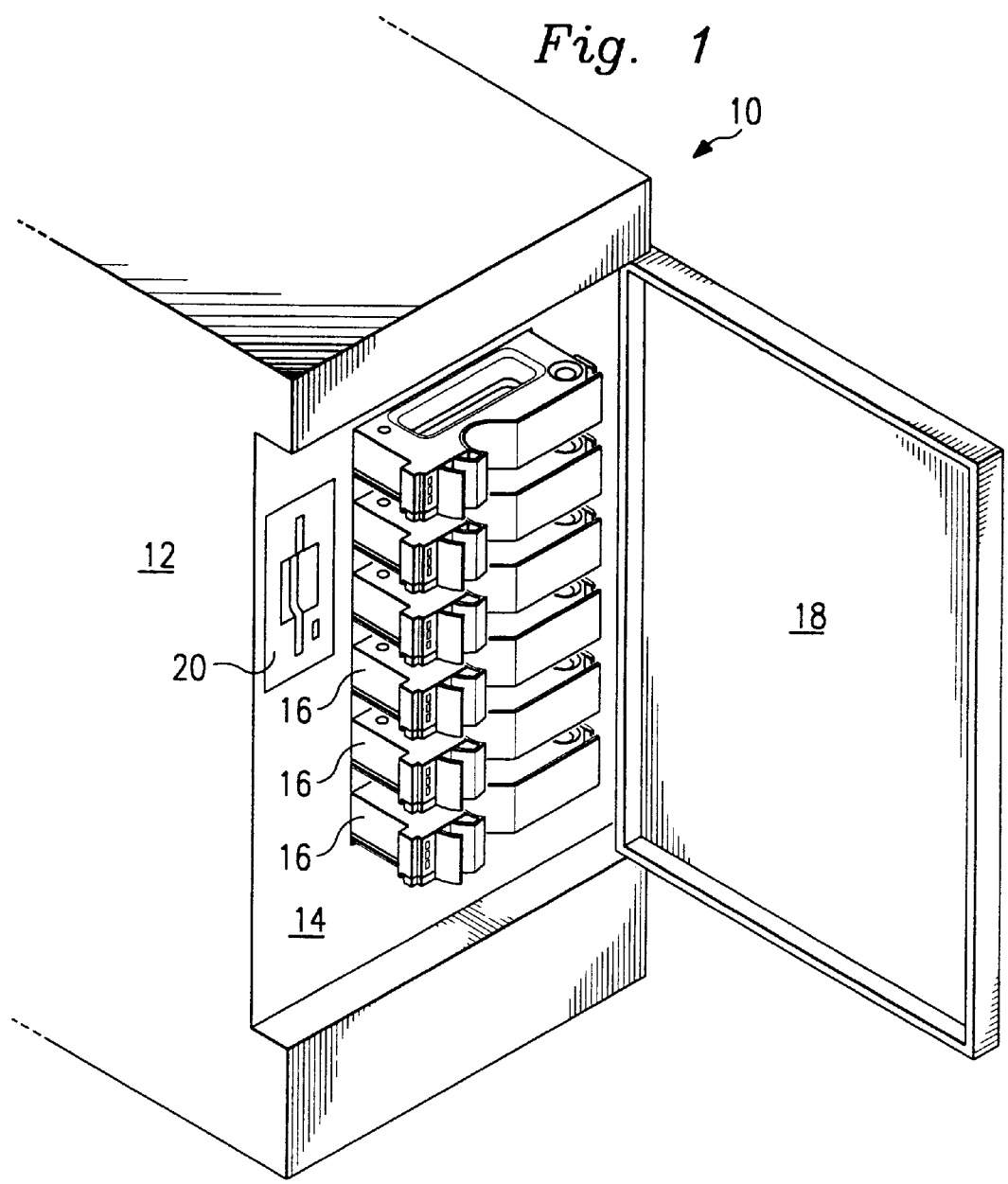
FIG. 1 is an isometric view of a computer incorporating features of the embodiment of the present disclosure.

Referring to FIG. 1 of the drawing, a computer is shown, in general, by the reference numeral 10, and, for the purpose of example, is shown in the form of a server having a chassis, or cabinet, 12. A front panel 14 is mounted in the upper portion of the cabinet 12, and six hard drive assemblies 16 are mounted in the cabinet in a manner to be described. The hard drive assemblies 16 extend horizontally in a slightly spaced relationship with their front portions extending through the panel 14 and projecting outwardly therefrom. A door 18 is hinged to the upper portion of the cabinet 12 and provides access to the hard drive assemblies 16, and a floppy disk drive 20 is mounted on the panel 14 and functions in a conventional manner.

FIG. 2 depicts a mounting plate 22 which is mounted in the rear of the cabinet 12 in any known manner to extend parallel to, and to the rear of, the front panel 14. The mounting plate 22 can extend parallel to the rear wall of the cabinet or can form the rear wall. Six vertically-spaced connectors 24 are fastened to the plate 22 in any known manner and are adapted to receive corresponding connectors (not shown) on the respective back ends of the hard drive assemblies 16, one of which is shown in FIG. 2, to mount the latter assemblies to the plate. Since all of these connectors are conventional, they will not be described in detail.

A mounting strip 26 is mounted to the plate 22 and receives a plurality of light sources 28, such as LEDs, which are mounted to the strip in any known manner. The light sources 28 are spaced in a manner to form six groups of three light sources per group. Each group of light sources 28 is aligned with a corresponding connector 24.

As shown in FIG. 3, each hard drive assembly 16 includes a carrier 30 that includes a base plate 32, and two side walls 34 and 36, extending upwardly from the base plate along its respective sides. A housing 38 is disposed at the front end of the base plate 32 and houses a motor (not shown) for the drive unit.

A series of notches are cut in the side walls 34 and 36 to define two spaced flexible tabs 40 and 42 forming a part of the side wall 34, and two spaced flexible tabs 44 and 46 forming a part of the side wall 36. A opening, which is preferably countersunk, is formed though each of the tabs 40, 42, 44, and 46.

As shown in FIG. 2, a drive unit 48 is mounted in the carrier 30 and has a rigid housing 48a having two spaced internally threaded openings formed in each side wall. The housing 48a is adapted to rest on the carrier base plate 32 and extend between the side walls 34 and 36 in a relatively tight fit, with the corresponding end of the housing 48a extending adjacent the rear wall of the housing 38. Two screws 49 extend through the openings in the tabs 44 and 46, and into the corresponding openings formed in one side wall of the housing of the drive unit 48; and two screws (not shown) extend through the openings in the tabs 40 and 42, and into corresponding openings formed in the other side wall of the latter housing, to secure the drive unit 48 in the carrier 30. The drive unit 48 is conventional and, as such, contains permanent memory and is adapted to be driven by the motor in the carrier housing 38.

Referring to FIG. 3, the side wall 36 is provided with an upper ledge 50 and a vertical ledge 52 extending downwardly from one end of the upper ledge at the end of the side wall. Three spaced slots 54 are formed through the corner defined by the side wall 36 and the ledge 52 for reasons to be described.

Figure 4:
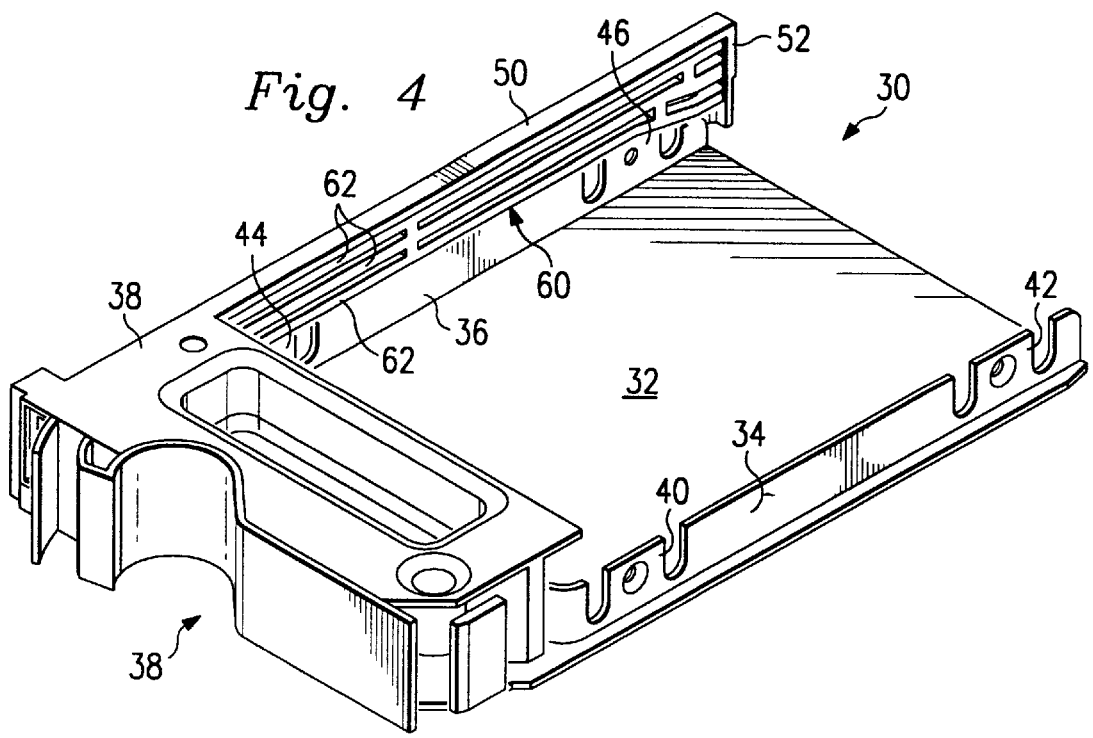
FIG. 4 is a view, similar to that of FIG. 3, but depicting the hard drive carrier of FIG. 3 in an assembled condition.

A multiple drop light pipe 60 is formed by a single strip of plastic having through notches formed therein for defining three elongated, spaced, parallel pipes 62. As shown in FIG. 4, the light pipe 60 snaps into a position adjacent the inner surface of the side wall 36, just below the ledge 50. The rear end of the light pipe engages the ledge 52 and the other end portion of the light pipe extends through the housing 38 and engages the rear surface of the front plate of the housing 38.

As shown in FIG. 2, each hard drive assembly 16 is installed on the plate 22 of the cabinet 10, by engaging the connector 24 on the plate with a corresponding connector (not shown) disposed on the rear end of each drive unit 48. In this mounted position, three light sources 28 of the corresponding group of light sources extend through the slots 54 of the carrier 30 and register with the corresponding ends of the three light pipes 62, respectively. Also, the other ends of the light pipes register 62 with three slots 38a formed through the front plate of the housing 38. As a result, light from all three of the light sources 28 is transferred to the front of each hard drive carrier 30 to provide visual function indications. In this context the latter ends of the light pipes 62 can be glazed to improve the transmission of the light.

Since the other hard drive assemblies 16 of FIG. 1 are identical to the hard drive assembly described above, they will not be described in detail.

Figure 5:
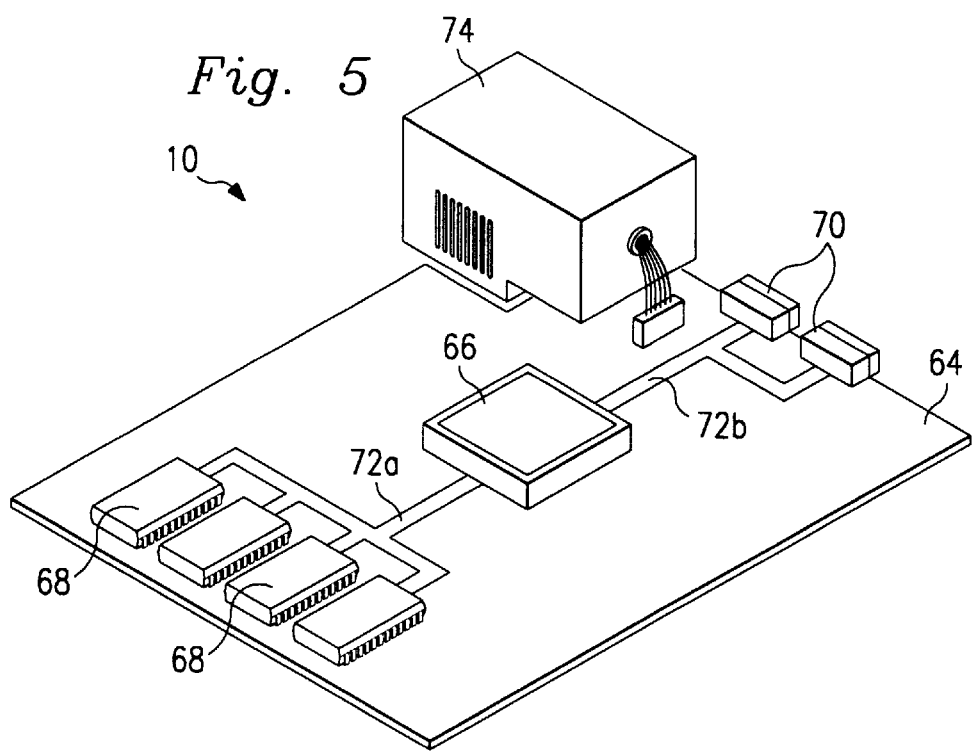
FIG. 5 is a diagrammatic view depicting some the basic components of the computer of the present invention.

The remaining essential components of the computer 10 are shown in FIG. 5 and include a motherboard 64 mounted in the cabinet 12 in any known manner. A processor 66, a plurality of memory modules 68, and two input/output (I/O) devices 70 are mounted on the motherboard 64. Two buses 72a and 72b are also provided on the motherboard 64 and connect the processor 66 to the memory modules 68 and to the input/output devices 70, respectively. A power supply 74 is connected to the motherboard 64, and it is understood that a plurality of cable assemblies (not shown) connect the hard drive assemblies 16 (FIG. 1) and the floppy drive 20 to the motherboard. It is understood that other components, electrical traces, electrical circuits and related devices (not shown) are provided in the cabinet 12. Since these are all conventional, they will not be described in any further detail.

The present invention thus permits the transfer of light from multiple light sources at the rear of the cabinet to the front of the carrier of the hard drive assembly without taking up an undue amount of space. This is especially advantageous in connection with computers functioning as servers having a plurality of hard drives, since each hard drive can be provided with multiple function indicators. Also, hard drive assemblies of different heights can be accommodated without compromising the light-transmitting ability through the light pipes.

It is understood that variations may be made in the foregoing without departing from the scope of the invention. For example, the number and specific orientation of the components discussed above can be varied within the scope of the invention. Also, the expressions "upper", "front" and "rear" are used for clarity of presentation and are not meant to be limiting. Further, the present invention is not limited to the use of LEDs for light sources, but is equally applicable to any appropriate light source. Further, the light from the light sources can be transferred to a front panel of the cabinet rather than to the end of the hard drive carrier.

It is understood that other modifications, changes and substitutions are intended in the foregoing disclosure and in some instances some features of the invention will be employed without a corresponding use of other features. Accordingly, it is appropriate that the appended claims be construed broadly and in a manner consistent with the scope of the invention.

What is claimed is:

1. A computer comprising a chassis; at least one memory disposed in the chassis; at least one storage disposed in the chassis; at least one mounting member disposed in the chassis; a plurality of light sources mounted on the mounting member; and at least one hard drive assembly mounted to the mounting member and comprising a base plate, a hard drive unit mounted on the base plate, at least one side wall extending from the base plate, a ledge formed at one end of the side wall, a housing disposed at other end of the side wall and having a front plate, and a single strip of material extending adjacent the side wall and between the ledge and the front plate and defining a plurality of light pipes respectively aligned with the light sources to respectively transmit light from the light sources to the front plate.

2. The computer of claim 1 wherein a plurality of slots are defined in the ledge and corresponding portions of the side wall for respectively receiving the light sources, the light pipes being in alignment with the respective slots, and therefore the respective light sources.

3. The computer of claim 1 wherein another ledge is formed on the upper surface of the side wall, the strip extending between the latter ledge and the base plate.

4. The computer of claim 1 wherein a portion of the strip extends through the housing.

5. The computer of claim 1 further comprising at least one connector mounted on the mounting member, and a connecter mounted on the base plate for connecting to a corresponding connector on the mounting member to mount each hard drive assembly to the mounting member.

6. A hard drive assembly for a computer, the assembly comprising a base plate, a hard drive unit mounted on the base plate, at least one side wall extending from the base plate, a ledge formed at one end of the side wall, a housing disposed at other end of the side wall and having a front plate, and a single strip of material extending adjacent the side wall and between the ledge and the front plate and defining a plurality of light pipes respectively aligned with the light sources to respectively transmit light from the light sources to the front plate.

7. The computer of claim 6 wherein a plurality of slots are defined in the ledge and corresponding portions of the side wall for respectively receiving the light sources, the light pipes being in alignment with the respective slots, and therefore the respective light sources.

8. The computer of claim 6 wherein another ledge is formed on the upper surface of the side wall, the strip extending between the latter ledge and the base plate.

9. The computer of claim 6 wherein a portion of the strip extends through the housing.

10. The computer of claim 6 further comprising at least one connector mounted on the mounting member, and a connecter mounted on the base plate for connecting to a corresponding connector on the mounting member to mount each hard drive assembly to the mounting member.

* * * * *